US010735553B2

(12) United States Patent
Johnston et al.

(10) Patent No.: US 10,735,553 B2
(45) Date of Patent: Aug. 4, 2020

(54) MICRO-SERVICES IN A TELECOMMUNICATIONS NETWORK

(71) Applicant: Level 3 Communications, LLC, Broomfield, CO (US)

(72) Inventors: Dana A. Johnston, Highlands Ranch, CO (US); Adam C. Uzelac, Rochester, NY (US); Claudia M. Combellas, Centennial, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 61 days.

(21) Appl. No.: 15/676,780

(22) Filed: Aug. 14, 2017

(65) Prior Publication Data

US 2018/0146068 A1    May 24, 2018

Related U.S. Application Data

(60) Provisional application No. 62/425,930, filed on Nov. 23, 2016.

(51) Int. Cl.
*H04L 29/08* (2006.01)
*H04L 12/46* (2006.01)
*H04L 29/06* (2006.01)
*H04L 12/803* (2013.01)

(52) U.S. Cl.
CPC .......... *H04L 67/32* (2013.01); *H04L 12/4625* (2013.01); *H04L 12/4641* (2013.01); *H04L 47/125* (2013.01); *H04L 65/1006* (2013.01); *H04L 65/403* (2013.01); *H04L 67/1023* (2013.01); *H04L 67/18* (2013.01); *H04L 67/306* (2013.01); *H04L 67/02* (2013.01)

(58) Field of Classification Search
CPC ........................... H04L 67/32; H04L 12/4625
See application file for complete search history.

(56) References Cited

U.S. PATENT DOCUMENTS

2005/0128946 A1*    6/2005  Murakami .......... H04L 12/2856
                                                  370/230
2006/0116138 A1    6/2006  Simsek et al.
(Continued)

OTHER PUBLICATIONS

International Search Report dated Dec. 28, 2017, Int'l Appl. No. PCT/US17/057987, Int'l Filing Date Oct. 24, 2017; 3 pgs.
(Continued)

*Primary Examiner* — Zhensheng Zhang (57) ABSTRACT

Aspects of the present disclosure involve systems, methods, computer program products, and the like, for providing services to customers or other users of a telecommunications network through implementation of one or more micro-services instantiated on the network. Through the micro-services, one or more of the processes or functions used to provide the services from the network may be separately located logically within the network, thereby divorcing such processes from dedicated service components of the network. The breaking apart of the processes to be instantiated within the network on a generic computing device of the network, otherwise known as "micro-services", allows the telecommunications to adjust or scale the available services in response to operating conditions of the network.

21 Claims, 8 Drawing Sheets

(56) References Cited

U.S. PATENT DOCUMENTS

| | | | |
|---|---|---|---|
| 2008/0134293 A1* | 6/2008 | Storm | H04L 63/083 |
| | | | 726/4 |
| 2010/0285797 A1 | 11/2010 | Ghai et al. | |
| 2010/0299437 A1 | 11/2010 | Moore | |
| 2014/0215267 A1 | 7/2014 | Hegdal | |
| 2016/0112521 A1* | 4/2016 | Lawson | H04L 67/16 |
| | | | 709/227 |
| 2016/0269564 A1 | 9/2016 | Lawson | |
| 2018/0013674 A1* | 1/2018 | Nainar | G06F 9/455 |

OTHER PUBLICATIONS

Written Opinion of the International Searching Authority dated Dec. 28, 2017, Int'l Appl. No. PCT/US17/057987, Int'l Filing Date Oct. 24, 2017; 9 pgs.

Xu, Chengzhi et al., "CAOPLE: A Programming Language for Microservices SaaS", In: 2016 IEEE Symposium on Service-Oriented System Engineering (SOSE); Retrieved from http://cms.brookes.ac.uk/staff/HongZhu/Publications/SOSE2016-CAOPLE-CMR.pdf Apr. 2, 2016 , 13 pgs.

International Preliminary Report on Patentability, dated May 28, 2019, Int'l Appl. No. PCT/US17/057987, Int'l Filing Date Oct. 24, 2017; 11 pgs.

\* cited by examiner

MICRO-SERVICES IN A TELECOMMUNICATIONS NETWORK

CROSS-REFERENCE TO RELATED APPLICATION

This application is related to and claims priority under 35 U.S.C. § 119(e) from U.S. Patent Application No. 62/425,930, filed Nov. 23, 2016 entitled "ARCHITECTURE FOR DELIVERY OF APPLICATIONS AND SERVICES," the entire contents of which is incorporated herein by reference for all purposes.

TECHNICAL FIELD

Aspects of the present disclosure generally relate to systems and methods for implementing a telecommunications network, and more specifically for initiating micro-services within a telecommunications network to provide one or more services to customers of the network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to its customers, long distance communication capabilities, high definition audio and/or video communication capabilities, and the like. In other examples, the telecommunication network may be utilized by other networks to provide certain services to customers of the other networks. In this manner, a telecommunication network may provide any number of communication services to the various customers purchasing those services from the network.

Traditionally, such telecommunication services are provided from dedicated components of the telecommunications network. For example, Internet access is provided by dedicated web servers that store Internet content available to requesting devices in communication with the network. Similarly, multi-person conferencing is provided through a dedicated conferencing device or components. The use of dedicated components of the network to provide the varied services to users of the network may limit the networks ability to scale the offered services based on the number of service requesters, to adapt to changes in the operating state of the network (such as during an attack or outage), and to respond to other operational parameters of the network. Thus, a telecommunication network that de-couples the services provided by the network from dedicated components or devices may provide added flexibility of the network to respond to changes in the operational environment.

SUMMARY

One implementation of the present disclosure may take the form of a method for operating a telecommunications network. The method may include the operations of receiving, at a computing device, an indication of a request for a service provided by the telecommunications network and instantiating a plurality of micro-service programs on at least one compute device of the telecommunications network, wherein each of the plurality of micro-service programs provide a portion of the requested service to a client of the telecommunications network. In addition, the method may include connecting the plurality of micro-service programs on the at least one compute device through a micro-service communication network and transmitting a destination address of the at least one compute device to a load balancer device of the telecommunications network, the destination address of the at least one compute device associated with the requested service of the telecommunications network.

Another implementation of the present disclosure may take the form of a networking device. The networking device may include at least one communication port for communication with at least one compute device of a telecommunications network, a processing device, and a computer-readable medium connected to the processing device. The computer-readable may be configured to store information and instructions that, when executed by the processing device, performs certain operations. Such operations may include receiving an indication of an increase in requests for a service provided by the telecommunications network, instantiating a plurality of micro-service programs on at least one compute device of the telecommunications network, wherein each of the plurality of micro-service programs provide a component of the service to a client of the telecommunications network, and storing a destination address of the at least one compute device at a load balancer device of the telecommunications network, the destination address of the at least one compute device utilized by the load balancer device to route a received request for the service provided by the telecommunications network to a subset of the plurality of micro-service programs executed by the at least one compute device.

DETAILED DESCRIPTION

Aspects of the present disclosure involve systems, methods, computer program products, and the like, for providing services to customers or other users of a telecommunications network through implementation of one or more microservices instantiated on the network. The services may include any telecommunication service, such as communication processing, conferencing, web access, and the like. In general, one or more of the processes or functions used to provide the services may be broken into pieces and located logically within the network, thereby divorcing such processes from dedicated service components of the network. The breaking apart of the processes to be instantiated within the network on a generic computing device of the network, otherwise known as "micro-services", allows the telecommunications to adjust or scale the available services in response to operating conditions of the network. For example, as more customers to the network request a particular service, more instances of the related micro-services may be created within the network to scale up the available service to meet the added demand. In another example, an outage within the network may be detected and services provided by those affected devices may be re-instantiated on other devices within the network. Micro-services allow the network to re-instantiate the processes on unaffected devices of the network as needed in response to the detected outage in some portion of the network.

In one particular embodiment, a micro-service system is provided within the telecommunications network. The system includes a load balancer that receives communications and, after analyzing a destination port identifier within or associate with the communication, routes the communication to a designated computing device of the network that executes one or more micro-service related to the communication. Other micro-services related to the communication may also be executed on the computing device, or other computing device of the network. A virtual network function (VNF) manager may communicate with the designated computing device and the load balancer to instantiate the various micro-services of the network and desired in response to one or more operational states of the network. In addition, several micro-service databases may be instantiated within the network to store data and other information that is used to provide the services to customers of the network. The micro-service databases may store redundant data and information or otherwise be available for multiple instances of executing micro-services to provide failover protection of the data. In this manner, micro-services may be deployed on any computing device within the network to aid in providing requested services to users of the network. Such systems also provide flexibility to the configuration of the network to respond to operational states of the network, such as user demand, outages of one or more components of the network, and/or attacks on the network components.

Figure 1:
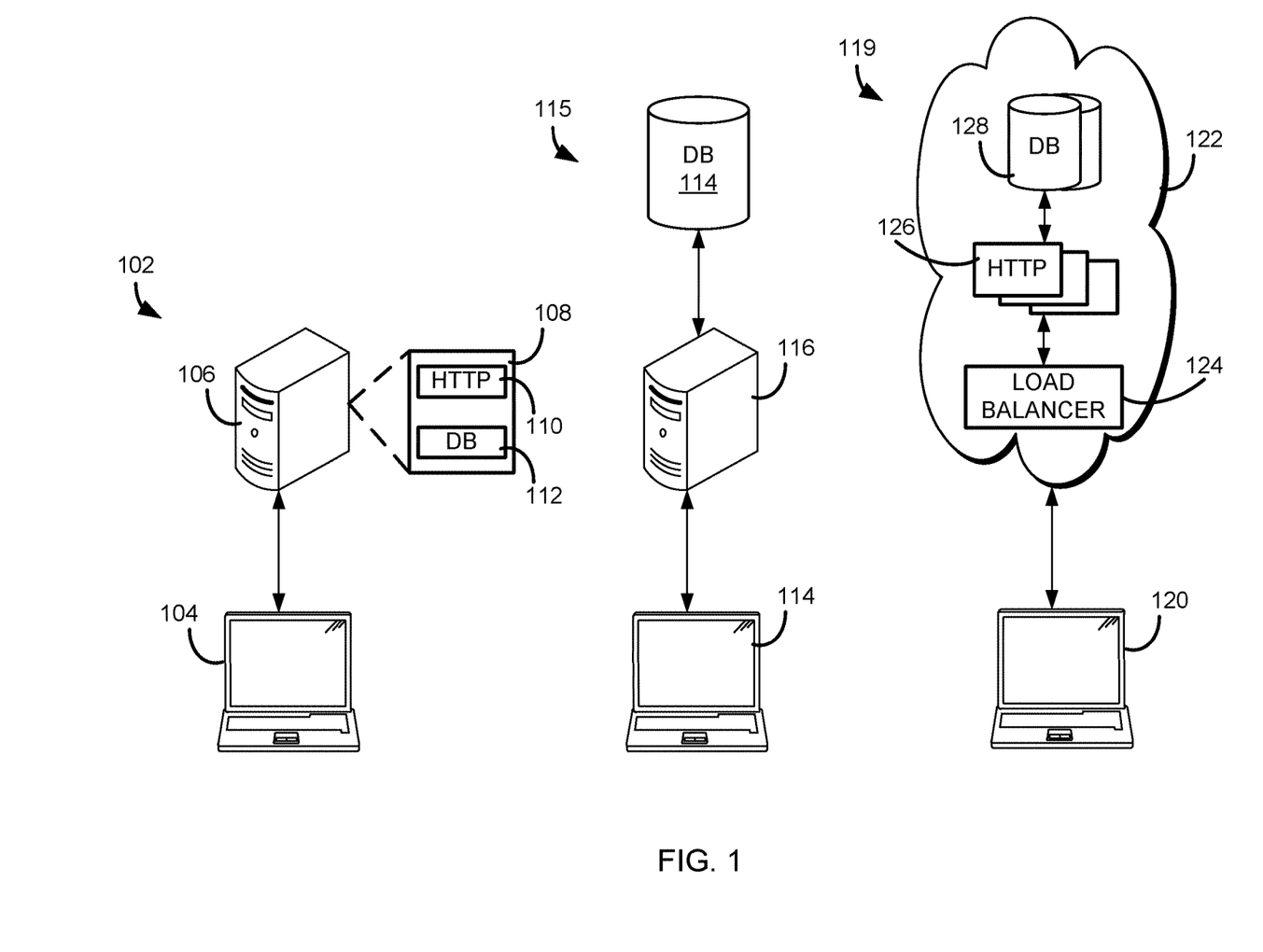
FIG. 1 is a diagram illustrating micro-services of a web server of a telecommunications network.

Beginning in FIG. 1, the concept of micro-services of a web server of a telecommunications network is illustrated. In general, the growth of a telecommunications network provides many challenges to administrators or operators of the network. For example, dedicated components, such as web servers, switches, edge devices like media gateways, are typically limited in the number of concurrent communications the device can process. Thus, as more and more users are added to the network, expansion of services is required. In one example, the network administrator may replace certain network components with some components with larger capacity. In another example, the network administrator may simply add additional components to provide the expected service requests from the users. In any event, there is some tradeoff between the cost of additional network capacity and the unused resources of the expanded service that may not immediately be utilized by the network users. Thus, many telecommunication network administrators do not expect to see a return on the investment of the expanded service availability until sometime in the future.

Through the implementation of micro-services in the telecommunication network, services provided by the network may be scaled as demand for the service is detected, without the need for purchase of a dedicated network component for the service. FIG. 1 illustrates several methods for providing a service to a user of a telecommunications network. In particular, the instances illustrated are for providing web services to a user. In configuration 102, a user 104 of a telecommunications network accesses a web server 106 to gain access to content stored on the server. The web server 106 may be hosted on the telecommunications network, as explained in more detail below. The web server 106 may execute several programs or processes 108 to provide the web service to the user 104. In such program may be an hyper-text transfer protocol (HTTP) processing program 110 that controls the communications between the user device 104 and the web server 106. The web server 106 may also include a database 112 of information, such as the content being requested by the user device 104 during the HTTP session of the devices. In general, the web server 106 would be a dedicated web server for the network to provide web services for users connected to the web server.

As more and more users are added to the network, additional web services may be needed to serve the users. One method to increase the number of users that may be served by a web server of the network is to purchase (and install within the network) a web server that can support and process a higher capacity so that more users may utilize the same web server to receive web service. However, the larger capacity web server would still be dedicated to providing web services to users of the network. Another method to increase the web service capacity of the network is to break apart functions of the web server into multiple dedicated components. For example, configuration 115 illustrates breaking apart the processes 108 described above for the web server into different components. In particular, the user device 114 may communicate with a web server 116 that is programmed to execute the HTTP processes, similar to above. However, rather than also programming the web server 116 to store the requested content or other data, a separate database 118 may be in communication with the web server 116 such that the web server may, in response to communications received from the user device 114, access data from the database 118. In essence, the database portion of the web service is utilized through the database and the HTTP process of the web service is utilized through the web server 116. This allows for the web server 116 and the database 118 to receive and process more communications than web servers 106 that include the database within the web server. However, although the configuration 115 allows for a higher capacity of web service for the network, the components are still dedicated to a process (database 118 for storing the content and web server 116 HTTP processing). Also, much of the additional capacity of the web service may go unused for some time until more users are added to the network to consume the added capacity, thereby providing some inefficiency into the expansion of the network.

In a third configuration 119, micro-services may be utilized to provide to the requested service to the user 120. In this embodiment, the user device 120 accesses the telecommunications network 122 requesting the web service from the network. Rather than utilizing a dedicated web server as above, the processes normally executed on the dedicated web server are executed as one or more micro-services within the network. That is, each micro-service performs an associated process of the web server, such as HTTP processing 126 and database 128 storage. Rather than executing these processes in a dedicated component of the network, however, the micro-services 126, 128 may be executed on any computing device of the network 122. Thus, a single computing device (such as a computing server) of the network may execute any number of micro-services for any number of services provided by the network to the user device 120. Further, each micro-service may be deployed any number of times on the computing devices of the network 122. The deployment of the micro-services 126, 128 on the computing devices of the network allows a network administrator to quickly increase or decrease the instances of the micro-services within the network in response to demand for the services, as well as allowing for redirecting of services to unaffected components of the network during an outage or an attack. As explained in more detail below, a request for a network service is directed to a load balancer 124 that is configured to determine which service is being requested by the user device 120 and to route the communication to the proper micro-service 126 for the requested service.

Figure 2:
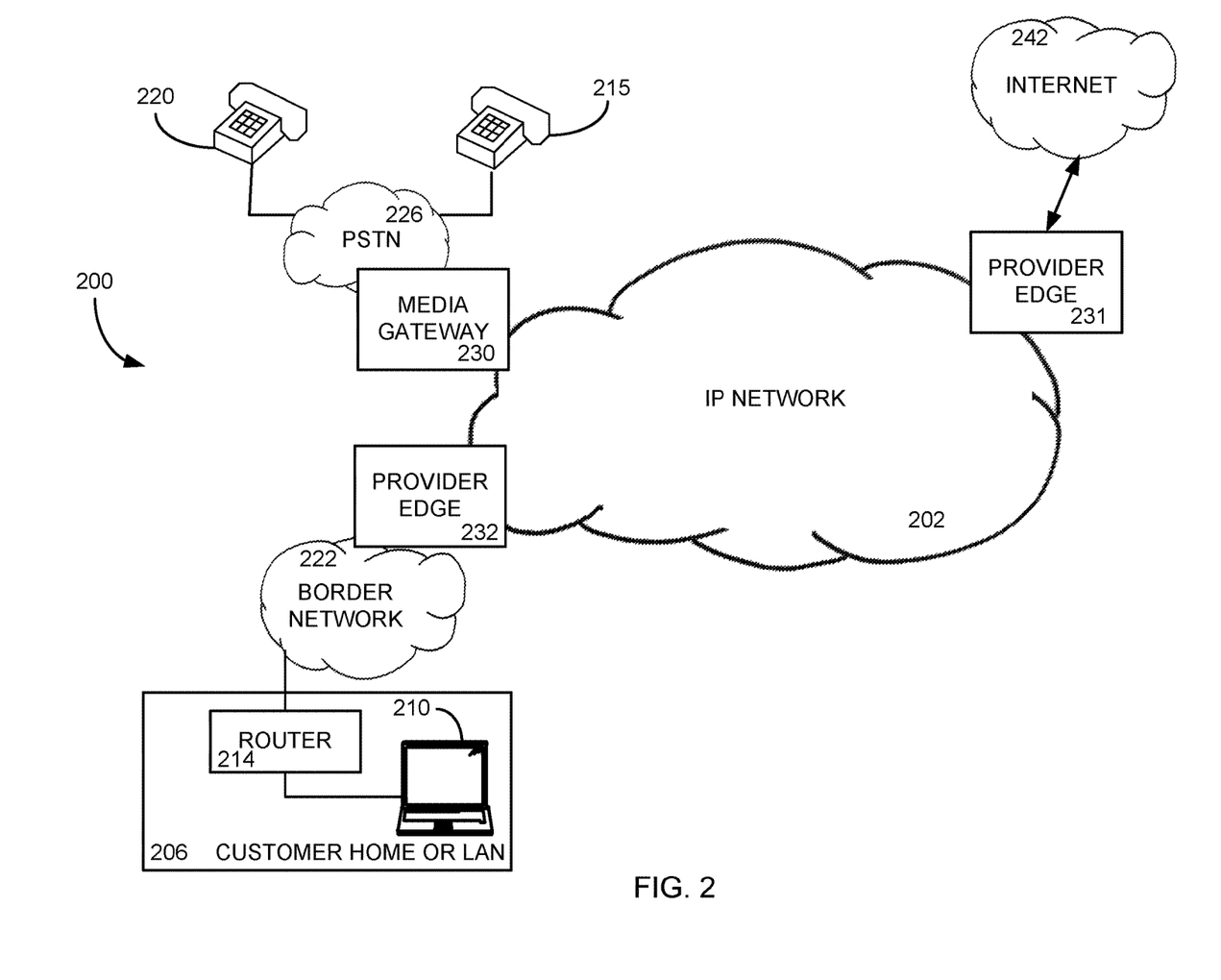
FIG. 2 schematic diagram illustrating an exemplary Internet Protocol (IP) operating environment in accordance with one embodiment.

Before discussing in more detail the application of micro-services within a telecommunications network, the general operation and structure of a telecommunications network is provided in FIG. 2. In general, the environment 200 provides for establishing communication sessions between network users and for providing one or more network services to network users. For example, users to the network 200 may communicate with each other through communication devices, including voice communications and video communications. With specific reference to FIG. 2, the environment 200 includes an IP network 202, which may be provided by a wholesale network service provider. However, while the environment 200 of FIG. 2 shows a configuration using the IP network 202; it should be appreciated that portions of the network may include non IP-based routing. For example, network 202 may include devices utilizing time division multiplexing (TDM) or plain old telephone service (POTS) switching. In general, the network 202 of FIG. 2 may include any communication network devices known or hereafter developed.

The IP network 202 includes numerous components such as, but not limited to gateways, routers, web servers, databases, compute services, and the like which enable communication and/or provides services across the IP network 202, but are not shown or described in detail here because those skilled in the art will readily understand these components. In some instances, those communications may be exchanged across the network 202 over long distances. Relevant to this description is the interaction and communication between the IP network 202 and other entities, such as the one or more customer home or business local area networks (LANs) 206, where a user of the network will connect with the network to request services from the network, such as communication processing, web services, and/or conferencing, among other telecommunication services.

Customer network 206 can include communication devices such as, but not limited to, a personal computer or a telephone 210 connected to a router/firewall 214. Although shown in FIG. 2 as computer 210, the communication devices may include any type of communication device that receives a multimedia signal, such as an audio, video or web-based signal, and presents that signal for use by a user of the communication device. The communication and networking components of the customer network 206 enable a user at the customer network 206 to communicate via the IP network 202 to other communication devices, such as another customer network 226 and/or the Internet 242. Components of the customer network 206 are typically home- or business-based, but they can be relocated and may be designed for easy portability. For example, the communication device 210 may be wireless (e.g., cellular) telephone, smart phone, tablet or portable laptop computer. In some embodiments, multiple communication devices in diverse locations that are owned or operated by a particular entity or customer may be connected through the IP network 202.

The customer network 206 typically connects to the IP network 202 via a border network 222, such as one provided by an Internet Service Provider (ISP). The border network 222 is typically provided and maintained by a business or organization such as a local telephone company or cable company. The border network 222 may provide network/communication-related services to their customers. In addition, the communication device 220 accesses, and is accessed by, the IP network 202 via a public switched telephone network (PSTN) 226 operated by a local exchange carrier (LEC). Communication via any of the networks can be wired, wireless, or any combination thereof. Additionally, the border network 222 and PSTN 226 may communicate, in some embodiments, with the IP network 202 through a media gateway device 230 or provider edge 232, 231. For ease of instruction, only three communication devices 210, 215, 220 are shown communicating with the IP network 202; however, numerous such devices, and other devices, may be connected with the network, which is equipped to handle enormous numbers of simultaneous calls and/or other IP-based communications.

As mentioned above, the IP network 202 may provide services to one or more customers to the network. For example, the network may provide connectivity to the Internet, long distance communication availability, content delivery network connectivity, multi-customer conferencing, etc. In some instances, components of the network 202 may store web content and/or other media content in one or more servers or databases within the network. In other instances, a conferencing bridge or manager may be provided that allows multiple users of the network 202 to communicate in a collaboration conference. In general, the telecommunications network 202 may be utilized to provide access to or directly provide one or more services to the user devices of the network. However, the components of the network 202 are typically dedicated to provide a particular service to a requesting customer. Thus, the network 202 may include one or more web servers to provide web access, one or more conferencing servers or bridges to provide conferencing services, and one or more Session Initiation Protocol (SIP) (or other transmission protocol) servers to process and connect voice or other IP-based communications.

Figure 3:
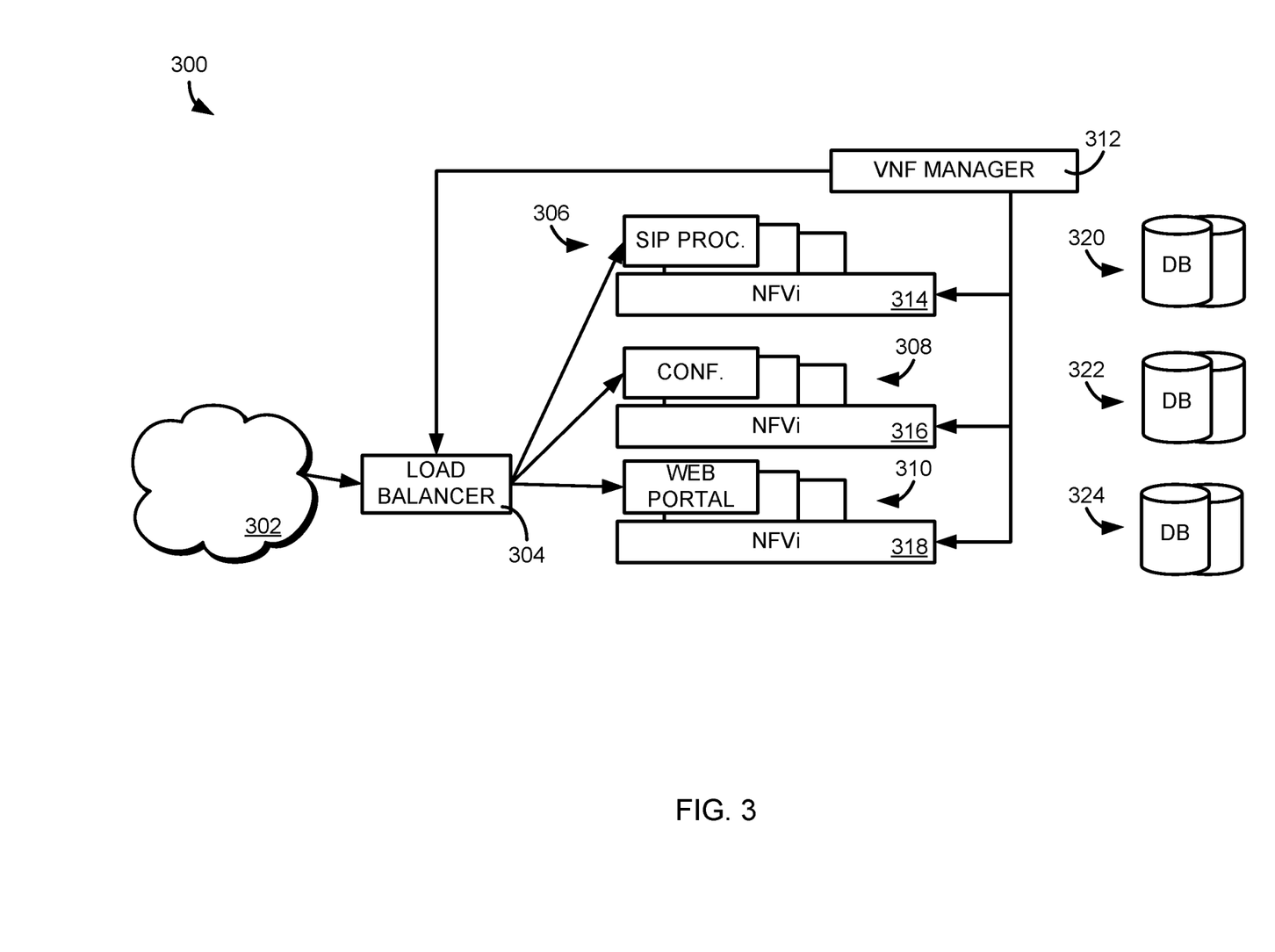
FIG. 3 is a schematic diagram illustrating a system for instantiating micro-services in a telecommunications network.

Rather than provide dedicated components of the network 202 to particular services, one embodiment of the telecommunications network may include micro-services instantiated on one or more computer servers of the network that are configured to perform a particular portion of a service available from the network. In this manner, the micro-services of the network services may be instantiated in any compute component of the network 202 to provide flexibility in the configuration and growth of the network. FIG. 3 is a schematic diagram illustrating a system 300 for instantiating one or more micro-services within a telecommunications network to provide services to requesting network users. In general, any of the components of the system 200 may be executed on a compute server or any other type of compute device associated or otherwise in communication with the network 202. Through the micro-service system 300, services may be provided to a user of the network 202 while also allowing for flexibility in adapting the network to changes in an operational state of the network.

It should be appreciated that the system 300 illustrated may be instantiated any number of times within the telecommunications network. Thus, the system 300 may be included in a variety of geographically dispersed locations within the telecommunications network to service communications form users in different geographic locations. As described above, communications from user devices are received at a border network, illustrated in FIG. 3 as network 302. The border network 302 determines which micro-service system 300 in the telecommunications network to which the received communication is transmitted. In one example, the communication may be a request for a service offered by the network, such as a voice communication that utilizes SIP communication protocol. To determine a destination within the network from which the service is provided, a component of the border network 302 transmits a domain name server (DNS) inquiry to a DNS of the telecommunications network. The DNS of the network is configured to return multiple destinations for the received communication that provide the desired service. In other words, because the micro-services of the network allow for multiple instantiations of the micro-service system 300, any number of destinations within the network may provide the service to the requesting device.

In one particular embodiment, the multiple destinations within the network returned to the border network 302 from the DNS may include a priority or other sorting identification. For example, the DNS may return three destinations within the network in response to the DNS inquiry sent by the border network 302. Each destination may include a priority in relation the other destinations. The border network 302 may then transmit the service request to the telecommunications network based on the priority of the returned results. In this manner, the DNS may be configured to steer particular service requests to particular destinations based on any operational condition of the telecommunications network. For example, the DNS may steer service requests to a first destination in the network for particular users and to a second destination for other users. In general, the DNS may determine and provide the destination priority in response to any condition of the telecommunications network, including load, detected outages, and service availability.

The border network 302, upon receiving the results of the DNS inquiry, transmits the service request to the telecommunications network, and in particular to a load balancer 304 of the network. As with any of the components of the system 300, the load balancer 304 may be a program executed on a computing device of the network. The load balancer 304 analyzes the incoming communication and determines a destination port included in or otherwise associated with the communication. For example, the incoming communication may include a destination port indicator or value included in a header or other metadata of the communication. The load balancer 304 is thus configured to determine the destination port of the communication and route the communication to one or more micro-services according to the destination port of the communication. In one embodiment discussed in more detail below, a virtual network function (VNF) manager 312 component of the system 300 may instruct the load balancer 304 as to which micro-service a communication should be transmitted based on a determined destination port. Thus, for a first destination port value, the load balancer 304 transmits the service request to a SIP processing micro-service 306. For other destination port values, the load balancer 304 may transmit the request to a conferencing micro-service 308, a web portal micro-service 310, or any other type of micro-service instantiated on a computing device within the telecommunications network.

As shown in the system 300 of FIG. 3, any number of micro-services related to services available from the telecommunications network may be executed on the network. For example, the system 300 may include any number of SIP processing micro-services 306 on any number of compute devices of the network. Further still, each SIP processing micro-service 306 may perform one or more functions related to SIP processing of an incoming communication. For example, one SIP processing micro-service may apply one or more security features to the communication, while other SIP processing micro-services may conduct stack processing of incoming communications. Those of ordinary skill in the art are aware of the various functions that are related to SIP processing of communications in a telecommunications network. Each of these functions may be executed by one or more micro-service programs executed on a compute device of the network. In other words, one or more programs within the network may be instantiated and executed to perform all or a portion of the SIP processing functions for a received communication. In a similar manner, micro-services related to a conferencing service 308 and micro-services related to web access 310 may also be included and executed within the network, among any other micro-services that may aid in providing services to a user of the network.

The various micro-services that are related to a particular service offered by the network may be connected through a network function virtualization infrastructure (NFVi) to transmit communications or other messages between the micro-services. Thus, in general, the NFVi operates as a communication network for related micro-services executing on the network to provide a particular service to one or more users of the network. In relation to FIG. 3, NFVi 314 provides communications between SIP processing micro-services 306 instantiated on the network to provide voice capabilities and services to users of the network. NFVi 316 operates similarly for the micro-services 308 associated with a conferencing service and NFVi 318 for the micro-services 310 associated with a web portal service of the network. Each NFVi 314-318 may include any components of the telecommunications network to facilitate communication between the micro-services of a particular network service provided to a user, including network servers, communication lines, compute devices, and the like. Each NFVi 314-318 may also provide some operational control over the associated micro-services, including instantiating one or more of the micro-services on compute devices of the network or dismantling a micro-service of the associated network service.

A virtual network function (VNF) manager 312 may also be included in the system 300 to control certain aspects of the micro-services of the network. For example, the VNF manager 312 may determine when additional micro-services should be created within the network in response to an increase in demand for a particular service. In some instances, the VNF manager 312 may instruct a NFVi associated with the particular service to create or otherwise instantiate one or more micro-services within the network associated with the particular service. In other instances, the VNF manager 312 may create or instantiate the new micro-service in the network and associate the micro-service with a corresponding NFVi (such as NFVi 314 for a SIP processing micro-service 306). A similar process may be executed by the VNF manager 312 to tear down or remove a micro-service instantiation on the network in response to an operational state of the network. In addition to creating the new micro-service instantiation on the network, the VNF manager 312 may communicate with a respective load balancer 304 to update an address list maintained by the load balancer to include the newly instantiated micro-service. In this manner, the VNF manager 312 may create a micro-service in response to a detected need for the micro-service in the network, instruct a corresponding NFVi to include the micro-service in the communication between similar micro-service, and add a destination address for accessing the micro-service to a list maintained by a load balancer 304. Similar actions may be completed in reverse to tear down or remove a micro-service when that service is no longer needed by the network.

As should be appreciated, the ability to instantiate or remove a micro-service on any compute device of the network in response to any condition of the network allows a faster and more flexible ability to increase and decrease capacity of the network. Previously, to add more voice processing capacity, the network would turn up one or more voice processing systems deployed in geographic areas where the demand for the voice service is high. As explained above, this process of responding to increased or decreased demand on the network is inefficient. However, through micro-services, the VNF manager 312 may create the processes that are utilized to provide voice processing services to a customer in any location in which a compute device is located within the system by instantiating one or more micro-services related to the voice processing service. These micro-services may be located in a geographic location that is near the demanding customer, or may be located in any location within the network that facilitates fast and reliable service providing. Once the voice processing service is provided to the customer, the micro-services may, in some instances, be torn down by the VNF manager 312 to free up the compute device to instantiate other micro-services.

Several databases 320-324 may also be included within the telecommunications network to aid in the services provided through the one or more micro-services. As shown in FIG. 3, databases 320 may be included for voice processing micro-services 306, databases 322 for conferencing micro-services 308, and databases 324 for web or Internet access services 320. In general, the databases may store any information or data that is utilized by micro-services when providing services to a customer of the network. For example, voice processing databases 320 may include call state information, routing information, media processing information, application control information, and the like. Further, separate instances of the databases 320 may be instantiated within the telecommunications network at various locations such that different micro-services 306 from different locations within the network can access and/or store information in the databases. Communication between the databases 320 may occur through the associated NFVi 314 of the micro-services 306. Thus, state information generated during use of a micro-service may be provided to a database and a redundant database such that each database maintains updated state information of the particular session. Because each database may include a redundant or backup database, failover from one micro-service 306 to another micro-service may occur quickly and efficiently, as explained in more detail below.

Figure 4:
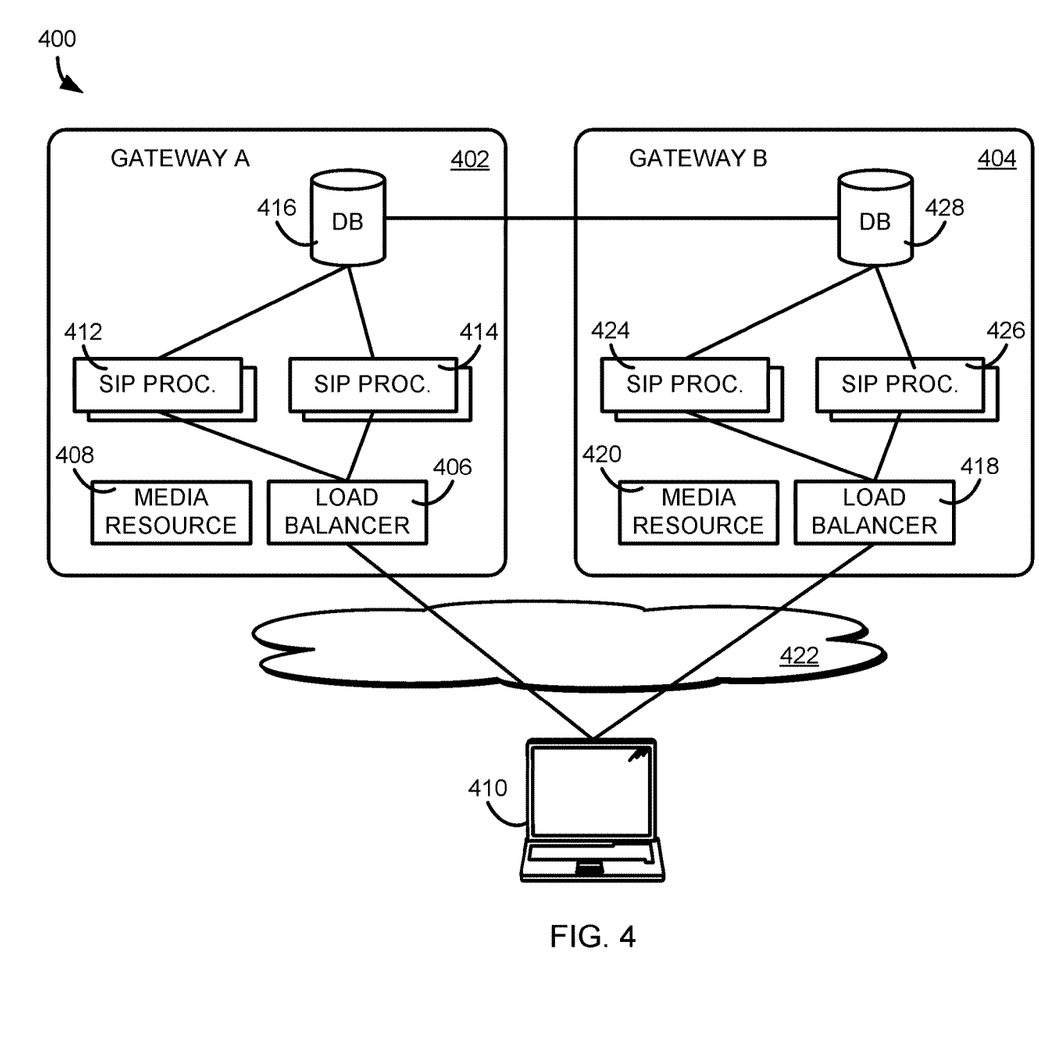
FIG. 4 is a schematic diagram illustrating utilizing a micro-service system for providing voice communication services to a user of a telecommunications network

Through the system 300 described above, a flexibility in the providing of services to customers of a telecommunications network may be achieved. FIG. 4 is a schematic diagram illustrating utilizing a micro-service system for providing voice communication services to a user of a telecommunications network that illustrates the flexibility of the system. Similar to that described above, a customer 410 accesses a telecommunication network 422 to receive a service from the network, such as voice processing, conferencing, web access, etc. In the example illustrated in FIG. 4, the customer 410 accesses the network 422 to connect a voice communication utilizing SIP communication protocol. The network 422 may include one or more micro-services to provide the voice processing service to the customer 410. Further, by utilizing micro-services, the service may be provided to the customer from any location within the network such that the network can load balance services between many different locations and providing devices to respond to changes in capacity demand of the network.

In the example of FIG. 4, a voice communication from the user device 410 is received at the telecommunications network 422. The network 422 routes the communication to a selected gateway 402 into the network for processing. The gateway 402 may include any number of executing micro-services or databases 416 associated with providing the voice processing service to the customer 410. Although illustrated as being a part of a single gateway 402, it should be appreciated that the components, micro-services, databases, connections, etc. of the gateway may be located anywhere within the network and may be shared among any number of other components of the network. In this manner, the gateway 402 does not need to be a gateway dedicated for providing the voice processing services to the customer 410. Rather, the various components of the voice processing service may be provided through micro-services executing on any number of compute devices located anywhere in the network. The collection of the components illustrated in the gateway 402 is for illustrative purposes only.

A load balancer (such as load balancer 406) receives the commutation from the network 422 based on a redirect command from a DNS of the network. Upon receipt, the load balancer 406 utilizes one or more micro-services executing on a compute device of the network to provide the voice processing service to the customer 410. In particular, the load balancer 406 analyzes a destination port of the received communication and, based on that destination port, determines which executing micro-service of the network to which the communication is to be routed. In other words, the destination port of the communication determines which service the customer 410 is requesting, such as voice processing. The VNF manager 312 previously discussed above provides to the load balancer 406 one or more network addresses at which the identified micro-service may be accessed. For example, the VNF manager 312 may provide a network address for SIP processing micro-service 412 or SIP processing micro-service 414 to the load balancer 406. The load balancer 406 may then select between the SIP processing micro-service 412 and SIP processing micro-service 414 to balance all requests for voice processing received at the load balancer.

Any number of micro-services may be instantiated and associated with the gateway 402. For example, one or more media resource micro-services 408 may be available if the voice communication includes a media component. Further, one or more of the associated micro-services of the gateway 402 may be in communication with a database 416 to store communication information and/or call state information for use by the SIP processing micro-services 412, 414. In general, all SIP processing micro-services 412, 414 are stateless such that any such micro-service may process any request received at the load balancer 406. In other words, because state information is stored in the shared database 416, a first SIP processing micro-service 412 may process a portion of the voice communication and a second SIP processing micro-service 414 may process a later portion of the voice communication. Each SIP processing micro-service 412, 414 may obtain a current call state from the shared database 416 to process the voice communication. Further, the SIP processing micro-services may be scaled horizontally to address capacity demands of the load balancer 406 or the network in general. For example, a VNF manager 312 may instantiate or otherwise creates SIP processing micro-services in response to an increased demand for such services at the network. The VNF manager 312 provides a network address for the additionally created SIP processing micro-services to the load balancer 406 for inclusion in the available micro-services. When voice communications are received at the load balancer 406, any number of the SIP processing micro-services may be utilized to process the communication. Similarly, SIP processing micro-services may be removed as demand for the service drops. As such, a network administrator does not need to purchase and install a new gateway device within the network in response to increased demand for voice processing in a particular location.

Further, because any SIP processing micro-service may process a voice communication, a fast failover feature may be provided by the network. For example, a database 416 of a first gateway 402 may share information with a second database 428 of another gateway 404. The second gateway 404 may include similar components and micro-services of the first gateway, namely a load balancer 418, SIP processing micro-services 424, 426, a media resource micro-service 420, and the second database 428. If a technical issue is detected at the first gateway 402, voice communications may be redirected to the second gateway 404 for processing. The load balancer 418 processes the redirect communication and provides it to a SIP processing micro-service 424. The SIP processing micro-service 424 accesses the second database 428 to retrieve the call state information for the processing and continues servicing the received communication. This failover process is discussed in more detail below. In general, because state information is not maintained by a particular SIP processing micro-service but is rather stored in a database or several shared databases, a particular voice session may be processed by any SIP processing micro-service as needed due to network operating state.

Figure 5:
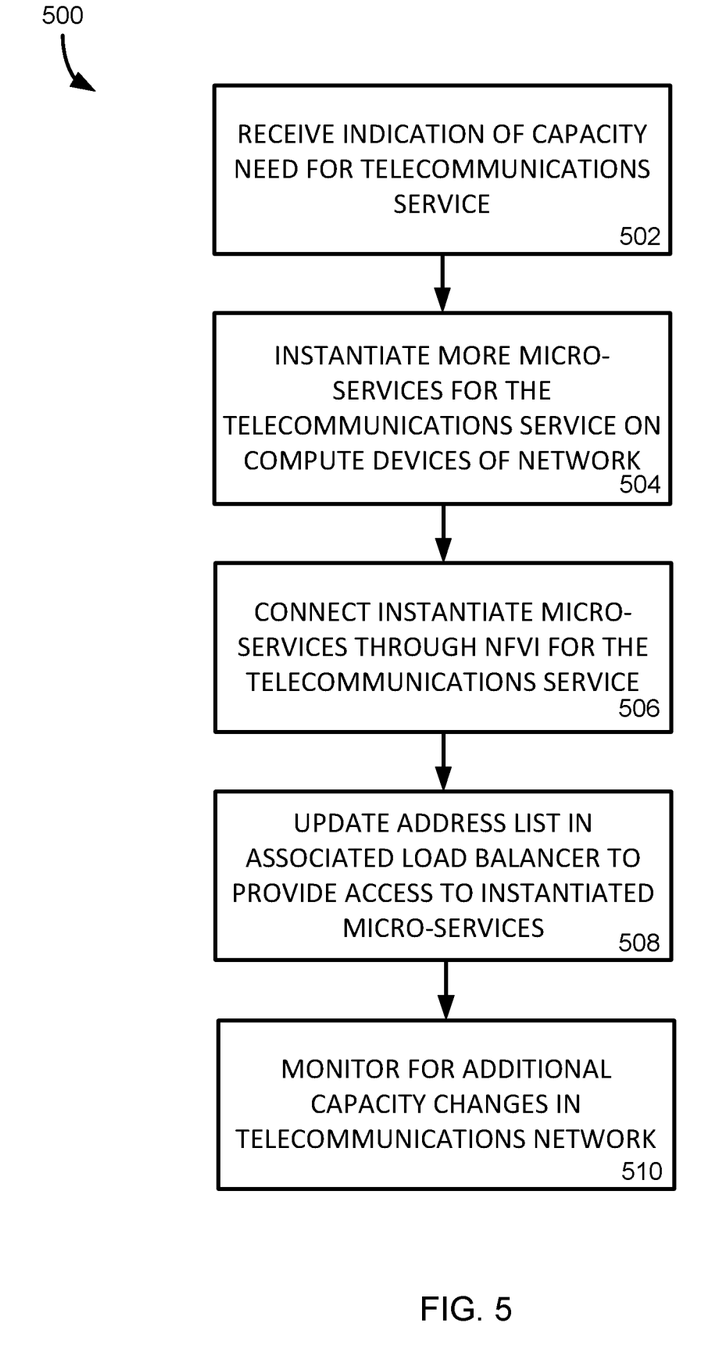
FIG. 5 is a flowchart of a method for a virtual network function manager to manage and control a micro-service system of a telecommunications network.

FIG. 5 is a flowchart of a method for a virtual network function manager to manage and control a micro-service system of a telecommunications network. In general, the operations of the method 500 of FIG. 5 may be performed by a VNF manager 312 of a telecommunications network such as that discussed above in relation to FIG. 3, although any number or type of component of the network may perform the operations. Beginning in operation 502, the VNF manager receives an indication of a capacity need for a telecommunication service. The need may be for any service offered by the telecommunications network, such as voice processing, web access, conferencing, etc. Further, the indication may be obtained by the VNF manager through an analysis of the network or may be received at the manager from a source. For example, the capacity indication may be provided by a load balancer that receives requests for services, from a network operations center that monitors network usage, from a network engineer, and the like. In general, the capacity indication suggests an increase in demand at the network for the particular network service.

In operation 504, the VNF manager instantiates one or more micro-services for the telecommunication service with a higher demand on one or more compute devices of the network. In one embodiment, the VNF manager may generate and transmit one or more instructions to components of the network to instantiate the one or more micro-services for the telecommunications service. In addition, in operation 506, the VNF manager may connect the instantiated micro-services by registering the micro-services to an associated NFVi of the network. This allows the instantiated micro-services to communicate with other micro-services to provide the telecommunication service to customers of the network.

As described above, the micro-services may be executed on any compute device or other network device associated with the telecommunications network. The selected device used to instantiate the micro-services may include a network address to which communications for the micro-service may be transmitted. Thus, in operation 508, the VNF manager may update a list of available micro-service locations within the network in a load balancer associated with providing the telecommunication services. By updating the address list at the load balancer, the instantiated micro-services are available to the load balancer to transmit received communications for that particular service. In operation 510, the VNF manager may continue to monitor for changes in demand for the telecommunications service and instantiate additional micro-services related to the service for an increase in demand or remove micro-services or decreases in demand.

Figure 6:
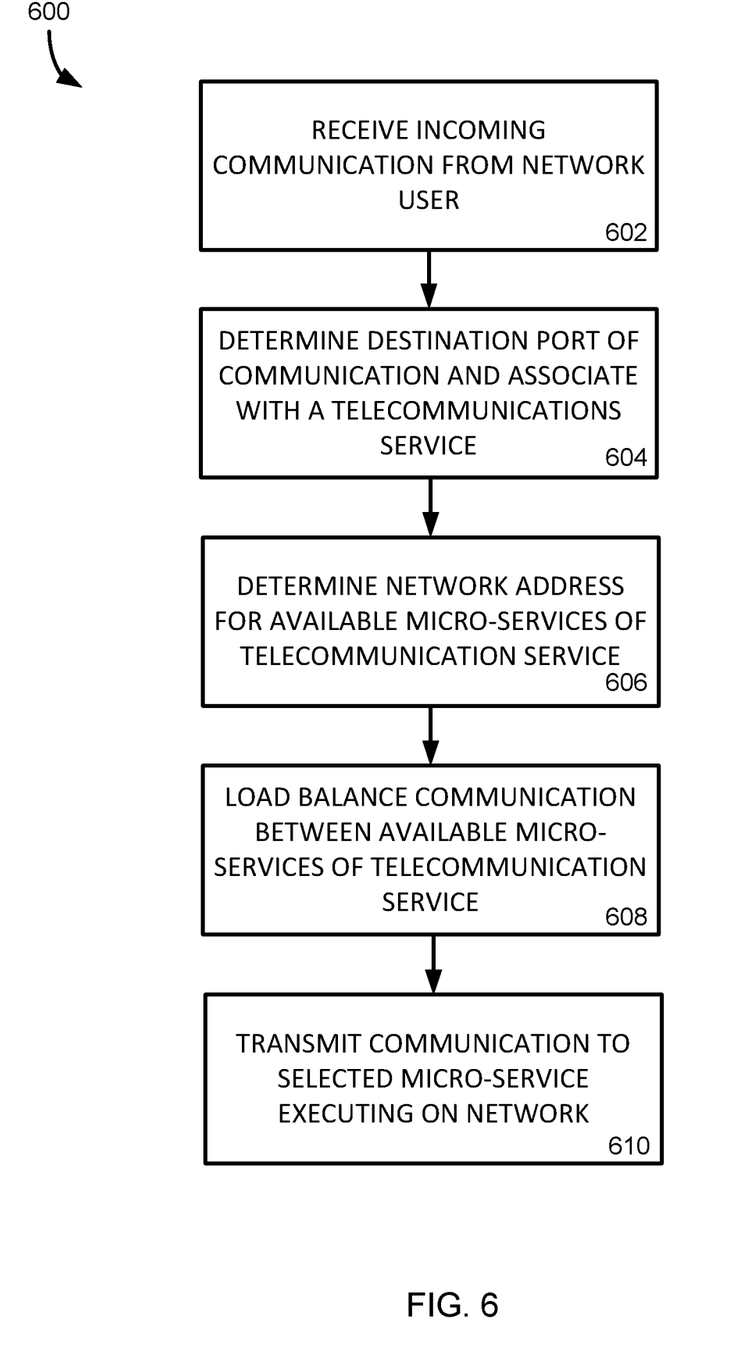
FIG. 6 is a flowchart of a method for a load balancer to manage and control communications in a micro-service system of a telecommunications network.

FIG. 6 is a flowchart of a method for a load balancer to manage and control communications in a micro-service system of a telecommunications network. In general, the operations of the method 600 of FIG. 6 may be performed by a load balancer 304 of a telecommunications network such as that discussed above in relation to FIG. 3, although any number or type of component of the network may perform the operations. Beginning in operation 602, the load balancer receives an incoming communication from a user of a telecommunications network. In some instances, the incoming communication may include a destination port indicator or value in a header or other portion of the communication. Thus, in operation 604, the load balancer obtains the destination port indicator of the communication and associates that indicator with a requested telecommunications service. In particular, the load balancer may be configured to associate particular destination port values with particular network services available from a telecommunications network. Thus, when a communication from a user is received, the load balancer may associate the destination port of the communication with a particular service being requested by the user's device.

In operation 606, the load balancer determines a network address at which a micro-service associated with the identified network service is executed. In particular, the micro-service may be executed on a compute device of the network that is accessible through a network address. Upon instantiation of the micro-service by a VNF manager described above, the network address at which the micro-service is available is provided to the load balancer. The load balancer than associates the network address with a micro-service that provides a portion of a telecommunications service. In one example, the micro-service may be a first portion of a service to initiate the service to the customer. The first micro-service may then access other micro-services associated with the service to provide the complete service to the customer of the network.

In some embodiments, the load balancer may select a particular micro-service from several available micro-services to send the communication in operation 608. In other words, many instances of the micro-services for the particular network service is available to receive communications and provide the service to customers of the network. The load balancer may then load balance incoming requests for services among the available micro-services. Once the particular micro-service is selected to begin providing the telecommunication service, the load balancer transmits the communication to the selected micro-service in operation 610. Through this method, the load balancer provides the communication to a micro-service to begin providing a service to a customer. Further, as explained above, other micro-services may be utilized during a service session to provide the service to the customer as needed based on an operational state of the network.

Figure 7:
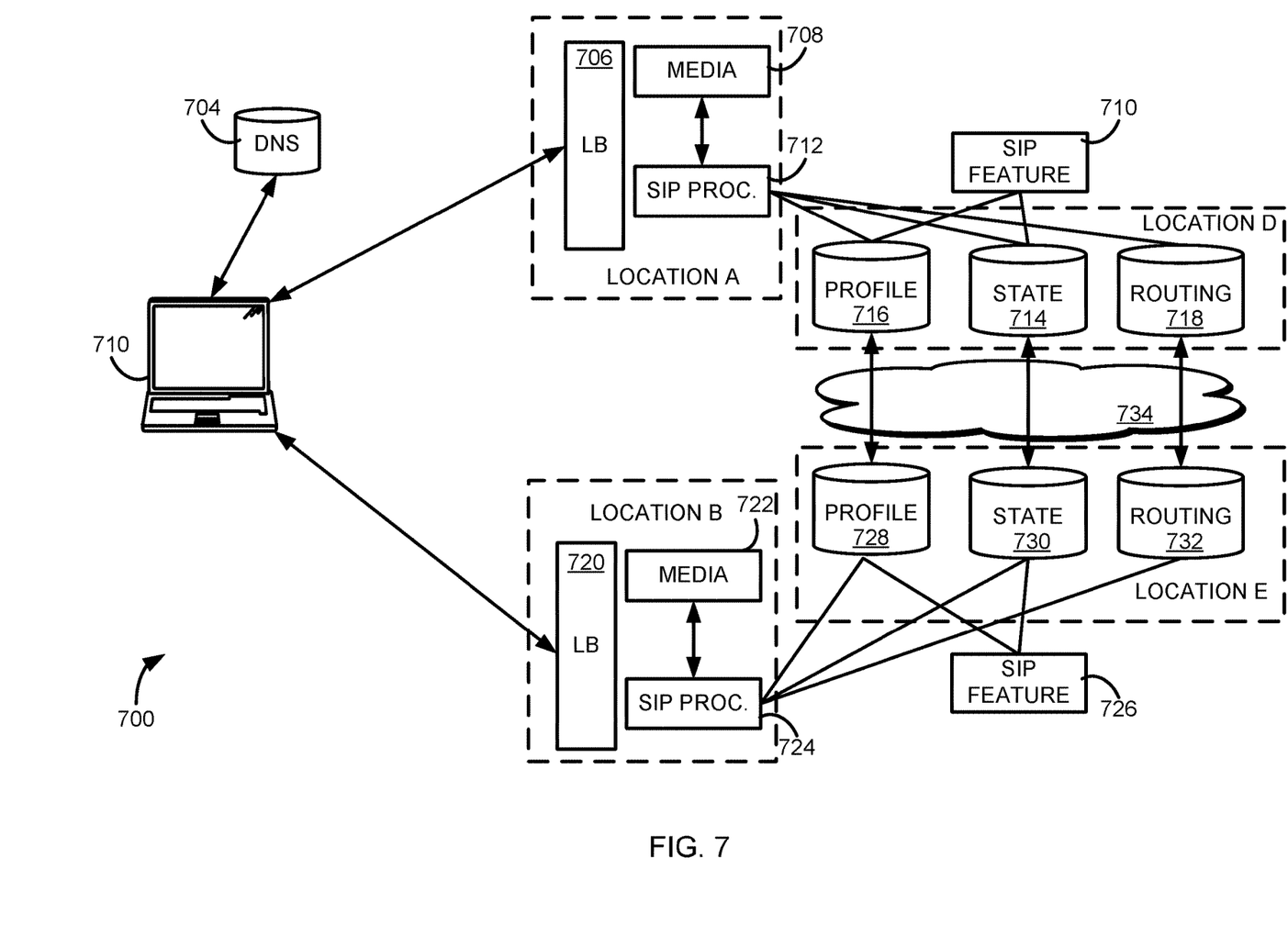
FIG. 7 is a diagram illustrating a failover sample call flow in a telecommunications network utilizing one or more micro-services of the network.

Through the use of micro-services within the telecommunications network, advantages in the operation of the network are gained that have been previously unavailable. For example, micro-services may be instantiated or dismantled as needed in response to demand for capacity in the network for a service is determined. In another example, because micro-services executing within the network may operate in a stateless manner, added flexibility in failover procedures is provided. In particular, FIG. 7 is a diagram illustrating a failover sample call flow in a telecommunications network utilizing one or more micro-services of the network. Several of the components of the system 700 illustrated in FIG. 7 are similar to or the same as that discussed above in relation to FIG. 4. However, the system 700 of FIG. 7 illustrates a sample call flow for providing a failover for an interrupted voice processing service provided by the network.

Similar to above, a customer device 710 contacts a telecommunications network 700 with a voice communication. Other services may also be requested by the customer device 710 and are handled in a similar manner as described. However, the example of the voice processing of the communication is provided. The network contacts a DNS 704 that returns to an access network at least one network address of a load balancer 706 of a selected destination or location within the network. In general, because any voice processing micro-service instantiated on the network may handle a voice communication, a load balancer in any location within the network may be selected. This functionality provides flexibility to the network to load balance requests for services from customers of the network among many locations within the network. Further, as explained above, the returned network address for load balancers within network may include a weighted value for each address to control the flow of service requests into the telecommunications network.

The access network of user device 710 follows the returned network address to the load balancer 706 at the first location (noted as "Location A" in the Figure). The load balancer 706 selects a SIP processing micro-service 712 to begin processing the received voice communication. The SIP processing micro-service 712 may call other micro-services to further process the voice communication. For some voice communications, a media resource micro-service 708 is utilized to provide some processing of the communication. To process the communication, the SIP processing micro-service 712 may access one or more databases storing voice processing information. Further, the databases may be located at the same location as the SIP processing micro-service 712 or may be in a separate location within the network, such as Location D of the Figure. Such databases may include a profile configuration database 716 that stores profile information of the user device 710, call state information database 714 that stores state information for the particular voice processing session, routing database 718 that stores routing information for routing the communication to a destination device, and the like. Further still, other SIP processing micro-services, such as SIP feature processing micro-services 710, may access the databases 714-718 to provide one or more features to the voice communication session. By utilizing micro-services to process the voice communication, the various components (SIP processing micro-service 712, SIP feature processing micro-service 710, various databases 714-718) may be located in separate locations within the network rather than being housed in a single gateway.

After some change in the operational state of the network, the voice processing may be changed from Location A to a second location of the network, such as Location B. Such changes in the operational state may include a fault or outage at Location A that causes a disruption in the voice processing service being provided through Location A. Other operational state changes may include an increased capacity demand for services at Location A or the micro-services at Location B coming online within the network. In general, however, any operational change or decision by the network or a network administrator may cause the voice processing service to be redirected to Location B. Similar to Location A, Location B may also include a load balancer 720, SIP processing micro-services 724, SIP feature processing micro-services 728, and media resource micro-services 722. Thus, upon a redirect from Location A to Location B, the user device 710 begins providing packets of the communication session to the load balancer 720 of Location B. The load balancer 720 accesses one or more micro-services 722-726 to process the voice communication. In particular, because the micro-services operate without maintaining the call state locally, the communication session may be picked up by the micro-services at Location B without the need to reestablish a new session with the network.

To provide the stateless nature of the micro-services, the databases 714-718 of Location D and utilized by the micro-services 712 of Location A may be replicated in databases 728-732 at Location E. In other words, information stored in profile configuration database 716 may be replicated in database 728, call state information stored in database 714 may be replicated in database 730, and routing information stored in database 718 may be replicated in database 732. Information added to databases 728-732 in Location E may also be replicated into databases 714-718 of Location D. Such information may be shared across a portion of the telecommunications network, such as through a virtual private network (VPN). Because this information is shared between the databases at the different locations, the executing micro-services at Location B can access the necessary information to pick-up the communication session at the last stored state for the call. Thus, SIP processing micro-services 724 can access the databases 728-732 at Location E to continue to process the voice communication session with little interruption in the service being provided.

Through the system 700 of FIG. 7, services provided by a telecommunications network can include a failover procedure that does not require establishing a new communication session. Previously, when a call or other communication session is interrupted due to a failure at a component of the network, a new call session is established as the call state of the session is lost. This occurs because typical call processing devices of the network will also include maintaining the call state within the device. Through the use of micro-services and shared databases, however, a communication session may be picked up with the current call state when the interruption occurs at a different location within the network. In addition, micro-services provide dynamic scaling of services available from the network in response to capacity demand at the network, without the need to purchase and install service dedicated components within the network. This added flexibility in the scaling and operation of providing services from the telecommunications network through the use of micro-services may improve the operation and efficiency of the network.

Figure 8:
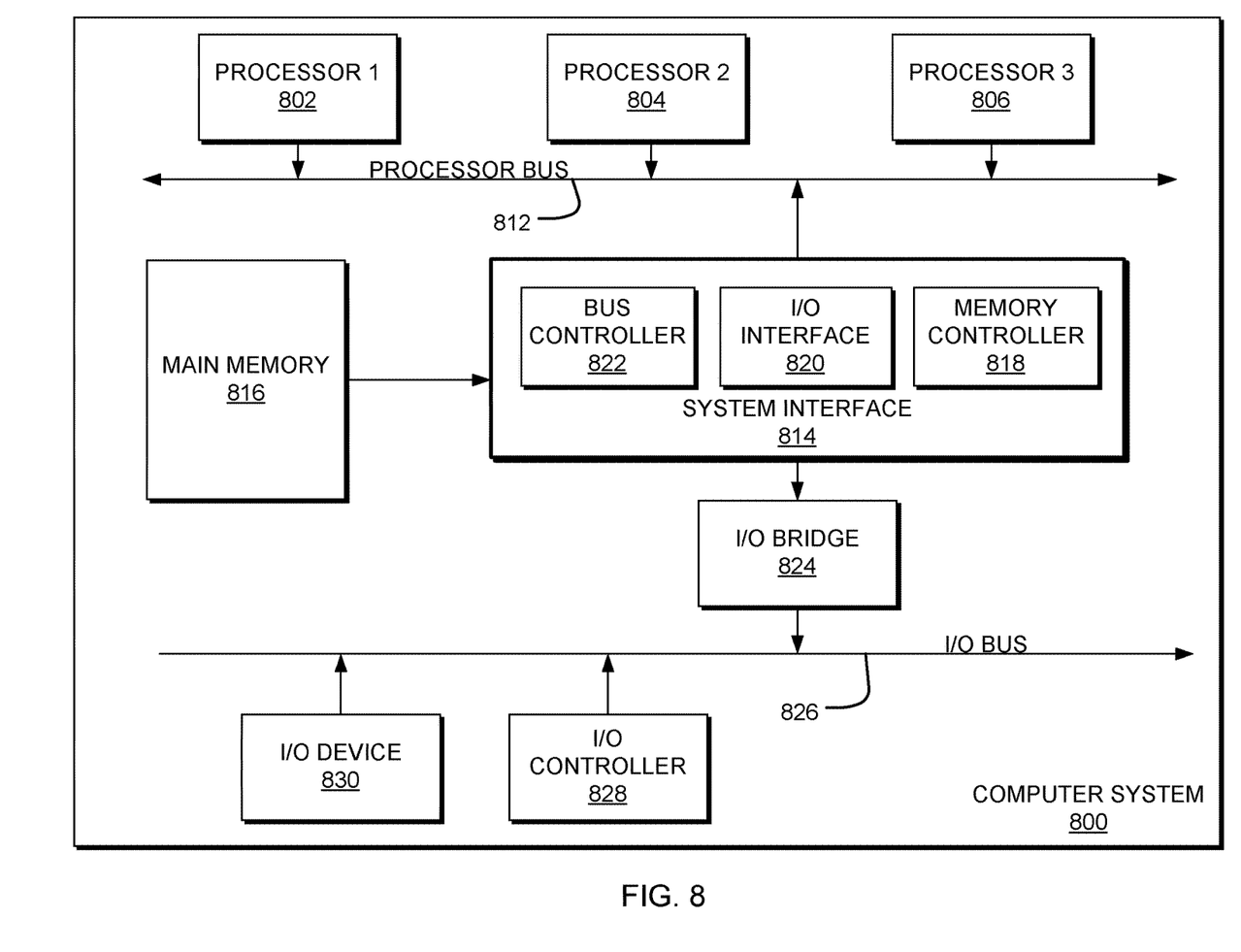
FIG. 8 is a diagram illustrating an example of a computing system which may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 may be a compute device on a network that executes and provides one or more of the micro-services discussed above or may be the VNF manager discussed above for managing one or more micro-services of the network. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 814 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 840, as illustrated.

I/O device 840 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a telecommunications network comprising:
receiving, at a computing device, an indication of a first request for a service provided by the telecommunications network;
instantiating a first plurality of micro-service programs on at least one first compute device of the telecommunications network, wherein each of the first plurality of micro-service programs provides a first portion of the service to a client of the telecommunications network and at least one second compute device of the telecommunications network provides a second portion of the service to the client of the telecommunications network;
connecting the first plurality of micro-service programs on the at least one first compute device through a micro-service communication network;

transmitting a destination address of the at least one first compute device to a load balancer device of the telecommunications network to enable access to the first plurality of micro-service programs instantiated on the at least one first compute device, the destination address of the at least one first compute device associated with the service of the telecommunications network;

receiving an indication of a second request for the service, the second request indicative of an increase in demand for the service; and instantiating, based on the first request and the second request, a second plurality of micro-service programs on the at least one second compute device of the telecommunications network without need to purchase and install service dedicated components within the telecommunications network, wherein each of the second plurality of micro-service programs provides another portion of the service to the client of the telecommunications network.

2. The method of claim 1 wherein the service comprises voice communication processing and the first plurality of micro-service programs comprises a Session Initiation Protocol (SIP) processing program receiving a user voice communication from a user communication device associated with the telecommunications network.

3. The method of claim 2 wherein the first plurality of micro-service programs further comprises a media processing program processing a media component of the user voice communication.

4. The method of claim 2 wherein the first plurality of micro-service programs further comprises a database utilized by the SIP processing program to store data associated with the voice communication processing of the user voice communication.

5. The method of claim 4 wherein the database stores call state information of the voice communication processing of the user voice communication.

6. The method of claim 5 wherein the call state information of the voice communication processing of the user voice communication is shared with a separate call state database for accessing by another of the first plurality of micro-service programs.

7. The method of claim 6 wherein the call state information of the voice communication processing of the user voice communication is accessing by the another of the first plurality of micro-service programs over a virtual private network (VPN) of the telecommunications network.

8. The method of claim 1 further comprising:
transmitting a second destination address of the at least one second compute device to the load balancer device of the telecommunications network, the second destination address of the at least one second compute device associated with the service of the telecommunications network.

9. The method of claim 1 wherein the service comprises a collaboration conferencing service provided by the telecommunications network.

10. The method of claim 1, wherein the micro-service communication network comprises a network function virtualization infrastructure to transmit messages between the first plurality of micro-service programs.

11. A networking device comprising:
at least one communication port for communication with at least one compute device of a telecommunications network;
a processing device; and
a computer-readable medium connected to the processing device configured to store information and instructions that, when executed by the processing device, performs the operations of:
receiving an indication of a first request for a service provided by the telecommunications network;
instantiating a first plurality of micro-service programs on at least one first compute device of a telecommunications network, wherein each of the first plurality of micro-service programs provides a first component of a service to a client of the telecommunications network and at least one second compute device of the telecommunications network provides a second component of the service to the client of the telecommunications network;
storing a destination address of the at least one compute device at a load balancer device of the telecommunications network to enable access to the first plurality of micro-service programs instantiated on the at least one first compute device, the destination address of the at least one first compute device utilized by the load balancer device to route a received request for the service provided by the telecommunications network to a subset of the first plurality of micro-service programs executed by the at least one first compute device;
receiving an indication of a second request for the service, the second request indicative of an increase in demand for the service; and
instantiating, based on the first request and the second request, a second plurality of micro-service programs on the at least one second compute device of the telecommunications network without need to purchase and install service dedicated components within the telecommunications network, wherein each of the second plurality of micro-service programs provides another component of the service to the client of the telecommunications network.

12. The network device of claim 11 wherein the processing device further performs the operation of connecting the first plurality of micro-service programs on the at least one first compute device through a micro-service communication network.

13. The network device of claim 11 wherein the service comprises voice communication processing and the first plurality of micro-service programs comprises a Session Initiation Protocol (SIP) processing program receiving a user voice communication from a user communication device associated with the telecommunications network.

14. The network device of claim 13 wherein the first plurality of micro-service programs further comprises a media processing program processing a media component of the user voice communication.

15. The network device of claim 13 wherein the first plurality of micro-service programs further comprises a database utilized by the SIP processing program to store data associated with the voice communication processing of the user voice communication.

16. The network device of claim 15 wherein the database stores call state information of the voice communication processing of the user voice communication.

17. The network device of claim 16 wherein the call state information of the voice communication processing of the user voice communication is shared with a separate call state database for accessing by another of the first plurality of micro-service programs.

18. The network device of claim 17 wherein the call state information of the voice communication processing of the user voice communication is accessing by the another of the first plurality of micro-service programs over a virtual private network (VPN) of the telecommunications network.

19. The network device of claim 11 wherein the service comprises a collaboration conferencing service provided by the telecommunications network.

20. The network device of claim 11 wherein the service comprises access to the Internet through a browser of a user communication device associated with the telecommunications network.

21. The network device of claim 11, wherein the instructions further cause the processing device to perform the operations of:

connecting the first plurality of micro-service programs on the at least one compute device through a network function virtualization infrastructure, the network function virtualization infrastructure configured to transmit messages between the first plurality of micro-service programs.

\* \* \* \* \*